(12) United States Patent
Kimura et al.

(10) Patent No.: US 6,506,872 B2
(45) Date of Patent: Jan. 14, 2003

(54) POLYCYANOARYL ETHER AND METHOD FOR PRODUCTION THEREOF

(75) Inventors: Kunio Kimura, Okayama (JP); Yuhiko Yamashita, Okayama (JP); Yasunori Okumura, Toride (JP); Shoji Ito, Tsukuba (JP)

(73) Assignee: Nippon Shokubai Co., Ltd., Osaka (JP)

( * ) Notice: Subject to any disclaimer, the term of this patent is extended or adjusted under 35 U.S.C. 154(b) by 70 days.

(21) Appl. No.: 09/843,320

(22) Filed: Apr. 25, 2001

(65) Prior Publication Data

US 2002/0007039 A1 Jan. 17, 2002

(30) Foreign Application Priority Data

Apr. 28, 2000 (JP) ......................... 2000-130877

(51) Int. Cl.$^7$ .............................................. C08G 65/40
(52) U.S. Cl. ...................... 528/211; 528/401; 528/422; 528/488; 528/481; 528/503
(58) Field of Search ................. 528/211, 401, 528/422, 488, 489, 503

(56) References Cited

U.S. PATENT DOCUMENTS

| | | | | |
|---|---|---|---|---|
| 4,812,507 A | * | 3/1989 | Matsuo et al. | |
| 4,853,443 A | * | 8/1989 | Matsuo et al. | |
| 4,977,234 A | * | 12/1990 | Matsuo et al. | |
| 5,089,340 A | * | 2/1992 | Matsuo et al. | |
| 6,172,181 B1 | | 1/2001 | Kimura et al. | ............... 528/401 |

FOREIGN PATENT DOCUMENTS

| | | | | |
|---|---|---|---|---|
| EP | 0 243 000 | 10/1987 | ............ C08G/65/40 |
| JP | 1-146858 | 6/1989 | ......... C07C/121/75 |

* cited by examiner

Primary Examiner—Duc Truong
(74) Attorney, Agent, or Firm—Fish & Richardson P.C.

(57) ABSTRACT

A novel polycyanoaryl ether exhibiting excellent heat-resistance, hydrolysis-resistance and weatherability, as well as industrially high general-purpose properties, and the method for the production thereof is to be provided. The polycyanoaryl ether of this invention is represented by the formula (1):

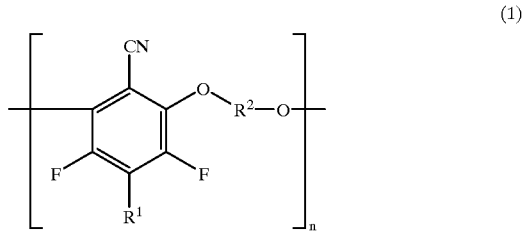

(1)

wherein $R^1$ stands for a substituted or unsubstituted alkyl group of 1 to 12 carbon atoms, a substituted or unsubstituted alkoxy group of 1 to 12 carbon atoms, a substituted or unsubstituted alkylamino group of 1 to 12 carbon atoms, a substituted or unsubstituted alkylthio group of 1 to 12 carbon atoms, a substituted or unsubstituted aryl group of 6 to 20 carbon atoms, a substituted or unsubstituted aryloxy group of 6 to 20 carbon atoms, a substituted or unsubstituted arylamino group of 6 to 20 carbon atoms, or a substituted or unsubstituted arylthio group of 6 to 20 carbon atoms; $R^2$ stands for a divalent organic group; and n stands for a degree of polymerization.

8 Claims, 6 Drawing Sheets

POLYCYANOARYL ETHER AND METHOD FOR PRODUCTION THEREOF

BACKGROUND OF THE INVENTION

1. Field of the Invention

This invention relates to a novel polycyanoaryl ether and method for production thereof.

2. Description of the Related Art

At present, although the revolution for a material has been progressed in the worldwide scale, a synthetic polymer material such as plastics has still played a central role, and now are superior to metallic materials and inorganic materials in view of moldability and workability as well as in view of cost.

These plastics are usually classified into general-purpose plastics which have been widely used in commodities of belongings, and the like; engineering plastics having excellent performance particularly in the mechanical characteristics and heat-resistance; and super engineering plastics having more excellent performance than the engineering plastics. Among these plastics, the engineering plastics are a high performance polymer material having both excellent heat-resistance (such as a continuously using temperature of not less than 100° C.) and high mechanical characteristics (including strength and elastic modulus). Such plastics have been established as an essential material in the industrial field including automobiles, electronic information, and precision instrument, and have been remarkably developed. A polyamide(nylon), an acetal resin, a polycarbonate, a polyester and a modified polyphenylene ether have been called as five typical engineering plastics.

The super engineering plastics have been developed for the purpose of improving the performance in the heat-resistance and mechanical characteristics as compared with conventional engineering plastics. The super engineering plastics have been receiving attention as a material capable of inviting the technological innovation in the wide industrial field including electronic information, precision instrument, and space aviation, following the general-purpose plastics and the engineering plastics.

This super engineering plastics have as a basic structure a polymer consisting of an aromatic skeleton. The related materials thereto include aramids (aromatic polyamides), polyethersulfones, polyarylates, polyphenylene sulfides, polyether ketones and polyetherimides, etc., and have successively been now commercialized.

In the meantime, aromatic polies ether nitrites (PEN) are one of materials to be expected as a super engineering plastic with excellent heat-resistance, hydrolysis-resistance and weatherability. Since these aromatic polies ether nitriles (PEN) contain a polar group, a cyano group, they excel also in adhesion properties to glass fibers, in addition to the above characteristics, and have used as a matrix for a composite material. The PEN which has been currently produced, however, has possessed such a problem as that the formation into a film, etc. is difficult due to the lack of solubility.

Therefore, an object of this invention is to provide a novel polycyanoaryl ether exhibiting excellent heat-resistance, hydrolysis-resistance and weatherability, as well as industrially high general-purpose properties, and the method for the production thereof.

Another object of this invention is to provide a novel polycyanoaryl ether having improved solubility in addition to the above-mentioned properties, and the method for the production thereof.

SUMMARY OF THE INVENTION

The present inventors have made diligent study in order to overcome the above problems, to find that by introducing a fluorine atom into an aromatic polyether nitrile, the cohesion between the main chains thereof would be weakened, and consequently the product can obtain the solubility. Further, the present inventors have also found that the polycyanoaryl ether thus obtained, because of its low polarizability of the C—F binding, can be expected to attain the improvement of the transparency and the decrease in the hygroscopicity, as well as the various properties as mentioned above and also expected to have the heat-resistance and the radiation resistance improved due to the bond dissociation energy of the C—F binding greater than that of the C—H binding. Accordingly, they have found that the introduction of a fluorine atom allows giving the solubility without deteriorating the original properties, thus the development of a new high performance material excelling to conventional PENs can be expected, while the introduction of a fluorine atom can decrease a dielectric constant of a material, which material can be expected to be applied as an electronic material.

Specifically, these objects can be accomplished by a polycyanoaryl ether represented by the formula (1):

(1)

wherein $R^1$ stands for a substituted or unsubstituted alkyl group of 1 to 12 carbon atoms, a substituted or unsubstituted alkoxy group of 1 to 12 carbon atoms, a substituted or unsubstituted alkylamino group of 1 to 12 carbon atoms, a substituted or unsubstituted alkylthio group of 1 to 12 carbon atoms, a substituted or unsubstituted aryl group of 6 to 20 carbon atoms, a substituted or unsubstituted aryloxy group of 6 to 20 carbon atoms, a substituted or unsubstituted arylamino group of 6 to 20 carbon atoms, or a substituted or unsubstituted arylthio group of 6 to 20 carbon atoms; $R^2$ stands for a divalent organic group; and n stands for a degree of polymerization.

These objects can be also accomplished by a method for the production of the polycyanoaryl ether of this invention which comprises polymerizing a tetrafluorobenzonitrile derivative represented by the formula (2):

(2)

wherein $R^1$ stands for a substituted or unsubstituted alkyl group of 1 to 12 carbon atoms, a substituted or unsubstituted alkoxy group of 1 to 12 carbon atoms, a substituted or unsubstituted alkylamino group of 1 to 12 carbon atoms, a substituted or unsubstituted alkylthio group of 1 to 12 carbon atoms, a substituted or unsubstituted aryl group of 6 to 20 carbon atoms, a substituted or unsubstituted aryloxy group of 6 to 20 carbon atoms, a substituted or unsubstituted arylamino group of 6 to 20 carbon atoms, or a substituted or unsubstituted arylthio group of 6 to 20 carbon atoms, with a dihydroxy compound represented by the formula (3):

HO—$R^2$—OH   (3)

wherein $R^2$ stands for a divalent organic group, in the presence of a basic catalyst.

Since the polycyanoaryl ether of this invention has high mechanical strength and toughness, and excellent electrical properties, and also can manifest excellent solubility in various solvents which have generally used, excellent heat stability such as heat-resistance and flame-resistance, and excellent film-formability, it is a material which can be subjected to significantly general-use in the industrial field, such as a heat-resistant material, a composite material matrix for aerospace, a composite material matrix for nuclear reactor, an electrical insulating material, a composite material matrix for electromagnetic shield, a macromolecular electrolyte (separator) precursor for fuel cell, an optical material of wave guide, and the like.

Further, the polycyanoaryl ether of this invention can be easily and efficiently produced without any necessity of special equipments by subjecting a tetrafluorobenzonitrile derivative to the copolycondensation with a dihydroxy compound.

The above and other objects, features and advantages of the present invention will become clear from the following description of the preferred embodiments.

DESCRIPTION OF THE PREFERRED EMBODIMENTS

The polycyanoaryl ether of this invention is a novel compound represented by the formula (1).

(1)

In the above formula (1), $R^1$ stands for a substituted or unsubstituted alkyl group of 1 to 12 carbon atoms, e.g., methyl, ethyl, propyl, isopropyl, butyl, isobutyl, sec-butyl, tert-butyl, pentyl, isopentyl, neopentyl, hexyl, heptyl, octyl, nonyl, decyl, undecyl, dodecyl and 2-ethylhexyl, preferably methyl, ethyl, propyl and butyl; a substituted or unsubstituted alkoxy group of 1 to 12 carbon atoms, e.g., methoxy, ethoxy, propoxy, isopropoxy, butoxy, pentyloxy, hexyloxy, 2-ethylhexyloxy, octyloxy, nonyloxy, decyloxy, undecyloxy, dodecyloxy, furfuryloxy and allyloxy, preferably methoxy, ethoxy, propoxy, isopropoxy and butoxy; a substituted or unsubstituted alkylamino group of 1 to 12 carbon atoms, e.g., methylamino, ethylamino, dimethylamino, diethylamino, propylamino, n-butylamino, sec-butylamino and tert-butylamino, preferably methylamino, ethylamino, dimethylamino and diethylamino; a substituted or unsubstituted alkylthio group of 1 to 12 carbon atoms, e.g., methylthio, ethylthio, propylthio and n-butylthio, sec-butylthio, tert-butylthio and iso-propylthio, preferably methylthio, ethylthio and propylthio; a substituted or unsubstituted aryl group of 6 to 20 carbon atoms, e.g., phenyl, benzyl, phenethyl, o-, m- or p-tolyl, 2,3- or 2,4-xylyl, mesityl, naphthyl, anthryl, phenanthryl, biphenylyl, benzhydryl, trityl and pyrenyl, preferably phenyl and o-, m- and p-tolyl; a substituted or unsubstituted aryloxy group of 6 to 20 carbon atoms, e.g., phenoxy, benzyloxy, a group derived from hydroxybenzoic acid and the esters thereof (for example, methylester, ethylester, methoxyethylester, ethoxyethylester, furfurylester and phenylester, and the like; which is hereinafter similar), naphthoxy, o-, m- or p-methylphenoxy, o-, m- or p-phenylphenoxy, phenylethynylphenoxy, and a group derived from cresotinic acid and the esters thereof, preferably phenoxy and naphthoxy; a substituted or unsubstituted arylamino group of 6 to 20 carbon atoms, e.g., anilino, o-, m- or p-toluidino, 1,2-or 1,3-xylidino, o-, m- or p-methoxyanilino and a group derived from anthranilic acid and the esters thereof, preferably anilino and o-, m- or p-toluidino; or a substituted or unsubstituted arylthio group of 6 to 20 carbon atoms, e.g., phenylthio, phenylmethanethio, o-, m- or p-tolylthio and a group derived from thiosalicylic acid and the esters thereof, preferably phenylthio. Among other groups cited above, substituted or unsubstituted aryloxy groups, arylthio groups and arylamino groups may be preferable and phenoxy, phenylthio and anilino may be most preferable as $R^1$.

Further, in the above formula (1), the substituent to be used when $R^1$ stands for a substituted alkyl, alkoxy, alkylamino, alkylthio, aryl, aryloxy, arylamino, or arylthio group can be suitably selected depending on the desired properties of the product, and should not be particularly limited. As the examples thereof, alkyl groups of 1 to 12 carbon atoms such as methyl, ethyl, propyl, isopropyl, butyl, isobutyl, sec-butyl, tert-butyl, pentyl, isopentyl, neopentyl, hexyl, heptyl, octyl, nonyl, decyl, undecyl, dodecyl; halogen atoms such as a fluorine atom, a chlorine atom, a bromine atom, an iodine atom; a cyano group, a nitro group, and a carboxyester group can be cited. Among other substituents cited above, methyl and a carboxyester group may be preferable.

In the above formula (1), $R^2$ stands for a divalent organic group. As the $R^2_1$ groups represented by the following formulae can be cited.

(wherein p is an integer in the range of 0 to 10, preferably 0 to 3.)

Among other $R^2$'s, the divalent organic groups represented by the following formulae may be preferable as the $R^2$.

Particularly, the divalent organic groups represented by the following formulae may be most preferable as the $R^2$.

In the above formula (1), n stands for a degree of polymerization, and may be specifically in the range of 5 to 1,000, preferable 10 to 500. Further, the polycyanoaryl ether of this invention may consist of unique repeating units or alternatively may consist of different kinds of repeating units. In the latter case, the repeating units may be either in a block form or a random form.

Although the method for producing the polycyanoaryl ether of this invention will be described below, it may be considered from this description that the polycyanoaryl ether of the formula (1) contains a fluorine atom at one terminus on the side of the benzene ring containing fluorine atoms and a hydrogen atom at another terminus on the side of the oxygen atom ($R^2$) On other words, the polycyanoaryl ether of the formula (1) is considered to be a polymer represented by the following formula (4).

(4)

The polycyanoaryl ether of this invention can be produced by polymerizing a tetrafluorobenzonitrile derivative represented by the formula (2):

(2)

with a dihydroxy compound represented by the formula (3):

HO—R²—OH        (3)

in the presence of a basic catalyst. In this case, the definitions for $R^1$ in the formula (2) and $R^2$ in the formula (3) are as defined for $R^1$ and $R^2$ in the formula (1).

In this invention, the tetrafluorobenzonitrile derivative of the formula (2) can be produced by the known method. For example, it can be obtained by reacting a compound represented by the formula: $R^1H$ [wherein $R^1$ is as defined in the above formula (1)] with 2,3,4,5,6-pentafluorobenzonitrile (in the present specification, referred to as "PFBN") in an organic solvent in the presence of a basic compound.

In the above reaction, each the compound of the formula: $R^1H$ and the PFBN can be used as a single compound or in the mixed form of two or more of the compounds of the formula: $R^1H$ and/or the PFBNs. In consideration with the purification process and the physical properties of the polymer, each of these compounds may be preferably used as a single compound. It is preferable that the total number of mols of the PFBN(s) to be used is equal to or substantially equal to the total number of mols of the compound(s) of the formula: $R^1H$. Typically, the amount of the compound(s) of the formula: $R^1H$ may be preferably in the range of 0.1 to 5 mols, more preferably 0.5 to 2 mols, per mol of the PFBN.

The organic solvent which is usable in the above reaction includes such polar solvents as N-methyl-2-pyrrolidinone, N,N-dimethylacetamide, acetonitrile, benzonitrile, nitrobenzene, nitromethane, and methanol; mixed solvents of such a nonpolar solvent as toluene and xylene with the polar solvent as mentioned above. These organic solvents may be used either singly or in the form of a mixture of two or more members. Further, the concentration of the PFBN in the organic solvent may be in the range of 1 to 40% by mass, preferably 5 to 30% by mass. In this case, when toluene or other similar solvent is used in the initial stage of the reaction, the water which is by-produced during the reaction can be removed as an azeotrope of toluene without reference to the polymerization solvent.

The basic compound to be used in the above reaction may desirably serve to collect hydrogen fluorine formed by the reaction so as to promote the reaction. As typical examples of the basic compound, potassium carbonate, calcium carbonate, potassium hydroxide, calcium hydroxide, potassium fluoride, triethylamine, tributylamine and pyridine may be cited. The amount of the basic compound to be used may be in the range of 0.1 to 5 mols, preferably 0.5 to 2 mols, per mol of the PFBN to be used.

The reaction conditions during the above reaction should not be limited so long as the reaction between the compound represented by the formula: $R^1H$ and the PFBN proceed efficiently. For example, the reaction may be carried out at a temperature generally in the range of 20 to 180° C., preferably 40 to 160° C., preferably with the reaction system kept in a stirred state. Further, the reaction period, though varied depending on other reaction conditions and the raw materials used, may be generally in the range of 1 to 48 hours, preferably 2 to 24 hours. Although the reaction may be carried out under a normal pressure or a reduced pressure, it is preferably carried out under a normal pressure from the viewpoint of equipment. The product by this reaction may be obtained by pouring distilled water into the reaction mixture, extracting the reaction product with such an extracting agent as dichloromethane, dichloroethane, or carbon tetrachloride, then separating an organic layer from the extract, and expelling the extracting agent by distillation. Then, it may be optionally recrystallized from methanol or ethanol to obtain as crystals.

The tetrafluorobenzonitrile derivative of the formula (2) thus synthesized is subjected to the polymerization with the dihydroxy compound of the formula (3) in the presence of a basic catalyst to produce the polycyanoaryl ether of the formula (1) aimed at, as described above. In this case, the tetrafluorobenzonitrile derivative of the formula (2) may be used in this polymerization step following the purification process as by recrystallization, chromatography and distillation, or alternatively used in its intact form without any purification process. The tetrafluorobenzonitrile derivative of the formula (2) may be preferably used after purified in consideration with the yield by the next step.

The dihydroxy compound of the formula (3) to be used in the above reaction can be selected in accordance with the structure of the polycyanoaryl ether of the formula (1) aimed at. As typical examples of the dihydroxy compound of the formula (3) which can be used preferably in this invention, 2,2-bis(4-hydroxyphenyl)-1,1,1,3,3,3-hexafluoropropane (hereinafter referred to as "6FBA"), 4,4'-dihydroxydiphenyl ether (hereinafter referred to as "DPE"), hydroquinone (hereinafter referred to as "HQ"), bisphenol A (hereinafter referred to as "BA"), 9,9-bis(4-hydroxyphenyl) fluorene (hereinafter referred to as "HF"), phenolphthalein (hereinafter referred to as "PP"), 9,9-bis (3-methyl-4-hyroxyphenyl) fluorene (hereinafter referred to as "MHF"), 1,4-bis(hydroxyphenyl)cyclohexane (hereinafter referred to as "CHB"), and 4,4'-dihydroxybiphenyl (hereinafter referred to as "BP") may be cited, as shown below.

-continued

HF

PP

MHF

CHB

BP

In the above reaction, each the tetrafluorobenzonitrile derivative of the formula (2) and the dihydroxy compound of the formula (3) can be used as a single compound or in the mixed form of two or more of the tetrafluorobenzonitrile derivative of the formula (2) and/or the dihydroxy compound of the formula (3). In consideration with the purification process and the physical properties of the polymer, each of these compounds may be preferably used as a single compound. It is preferable that the total number of mols of the tetrafluorobenzonitrile derivative(s) of the formula (2) to be used is equal to or substantially equal to the total number of mols of the dihydroxy compound(s) of the formula (3). Typically, the amount of the dihydroxy compound(s) of the formula (3) may be preferably in the range of 0.1 to 5 mols, more preferably 1 to 2 mols, per mol of the tetrafluorobenzonitrile derivative of the formula (2).

Although the above reaction can be carried out in an organic solvent or in the absence of a solvent, it is preferably carried out in an organic solvent. In the former case, the organic solvent which is usable herein includes such polar solvents as N-methyl-2-pyrrolidinone, N,N-dimethylacetamide, acetonitrile, benzonitrile, nitrobenzene, nitromethane, and methanol; mixed solvents of such a nonpolar solvent as toluene and xylene with the polar solvent as mentioned above. These organic solvents may be used either singly or in the form of a mixture of two or more members. Further, the concentration of the tetrafluorobenzonitrile derivative of the formula (2) in the organic solvent may be in the range of 1 to 50% by mass, preferably 5 to 20% by mass. In this case, when toluene or other similar solvent is used in the initial stage of the reaction, the water which is by-produced during the reaction can be removed as an azeotrope of toluene without reference to the polymerization solvent.

In this invention, it is essential that the reaction between the tetrafluorobenzonitrile derivative of the formula (2) and the dihydroxy compound of the formula (3) be carried out in the presence of a basic catalyst. The basic catalyst may preferably serve to convert the dihydroxy compound of the formula (3) into the anion having higher reactivity so as to promote the polycondensation with the dihydroxy compound of the formula (3). As typical examples thereof, potassium carbonate, calcium carbonate, potassium hydroxide, calcium hydroxide, and potassium fluoride maybe cited. The amount of the basic catalyst to be used is not particularly limited so long as the reaction of the tetrafluorobenzonitrile derivative of the formula (2) with the dihydroxy compound of the formula (3) proceed well. Typically, it may be in the range of 0.1 to 5 mols, preferably 0.5 to 2 mols, per mol of the tetrafluorobenzonitrile derivative of the formula (2) to be used.

The reaction conditions during the above polymerization reaction should not be limited so long as the reaction of the tetrafluorobenzonitrile derivative of the formula (2) with the dihydroxy compound of the formula (3) proceed efficiently. For example, the polymerization temperature may be preferably not more than 200° C., more preferably in the range of 20 to 150° C., most preferably 40 to 100° C. By the reaction at such a low temperature, there are merits that no special equipments are necessary, the side reaction can be repressed, and the gelation of the polymer can be prevented. Further, the polymerization period, though varied with other reaction conditions and the raw materials used, may be preferably in the range of 1 to 48 hours, more preferably 2 to 24 hours. Although the polymerization reaction maybe carried out under a normal pressure or a reduced pressure, it may be preferably carried out under a normal pressure from the viewpoint of equipment.

After the polymerization reaction has been completed, the polymer aimed at can be obtained by removing the solvent from the reaction solution as by distillation and, when necessary, refining the distillate. Alternatively, the polymer can be obtained by adding the reaction solution to a solvent in which the polymer exhibits a low solubility thereby causing the polymer to precipitate as a solid and separating the precipitate by filtration.

Now, this invention will be described more specifically below with reference to working examples.

In the working examples, physical properties were evaluated as following.

The chemical structures of the monomer and polymer to be synthesized in the following examples have been determined and confirmed by FT-IR (produced by JASCO Corporation, under the trademark of "FT-IR 350"), and $^{1}$H- and $^{19}$F-NMR (produced by Varian Inc., under the trademark of "Unity-500"; the operation conditions are at 500 MHz in $^{1}$H-NMR, and at 470 MHz in $^{19}$F-NMR) using CDCl$_3$ as a solvent. 4,4'-Difluorobenzophenone was used as an internal standard for $^{19}$F-NMR measurements.

Reduced viscosity measurements were carried out by using an Ostwald-Fenske viscometer in dimethylacetamide (DMAc) at a concentration of 0.5 g/100 ml and at a temperature of 25° C.

Glass transition temperatures (Tg) and melting temperatures (Tm) were measured on a differential scanning calorimeter (produced by Perkin-Elmer Corp., under the trademark of "DSC7") at a heating rate of 20° C./min in a nitrogen atmosphere.

Thermal stabilities were measured on a thermogravimeter (produced by Perkin-Elmer Corp., under the trademark of "TGA7") at a heating rate of 20° C./min in a nitrogen atmosphere.

Molecular weights were measured by gel permeation chromatography (GPC) using polystyrene as a standard. In this case, an NMP solution containing 10 mM/liter of LiBr was used as a developing solution, and the measurement were performed at a flow rate of 0.7 ml/minute and at a column temperature of 40° C.

Solubility was determined by placing a sample polymer in a solvent so as to give a concentration of 20% by mass and observing the difference in solubility therein, and then the solubilities were classified as below. ++: Soluble at a room temperature, +: Partially soluble, ±: Swollen, –: Insoluble.

Film-formability was determined by placing a sample polymer in toluene so as to give a concentration of 20% by mass, bar-coating the resultant 20 wt % toluene solution (depending the kind of the polymer, in a dispersion form) on a glass substrate and observing the film-formability, rigidity, and hue. The film-formabilities were classified as below. ++; Excellent, +; Good, ±; Poor, –; Very poor.

Synthetic Example 1

Synthesis of 4-phenoxy-2,3,5,6-tetrafluorobenzonitrile (PtFBN)

The following reaction was carried out as below.

More specifically, in a flask provided with a reflux tube and a Dean-Stark trap of 100 ml in volume, 5.0 g (53.2 millimoles) of phenol, 3.67 g (26.6 millimoles) of potassium carbonate ($K_2CO_3$), 60 ml of N-methyl-2-pyrrolidinone (NMP) and 15 ml of toluene were placed. The resultant mixture was subjected to the azeotropic dehydration at 130° C. for two hours under a nitrogen current, to synthesize a potassium salt of phenol. After the stoichiometric amount (about 1 ml) of water had been confirmed, toluene was removed by distillation, and the residual solution was gradually cooled. At the time when temperature of the reaction solution reached 100° C., 10.26 g (53.2 millimoles) of 2,3,4,5,6-pentafluorobenzonitrile was added to the reaction solution. The resultant mixture was reacted for 8 hours with this temperature maintained. After the reaction had been completed, 50 ml of distilled water was added thereto and extracted with dichloromethane. Further, the collected organic layer was washed with water, dried with sodium sulfate, and then dichloromethane was removed by distillation, to afford a brown oily crude product.

Figure 1:
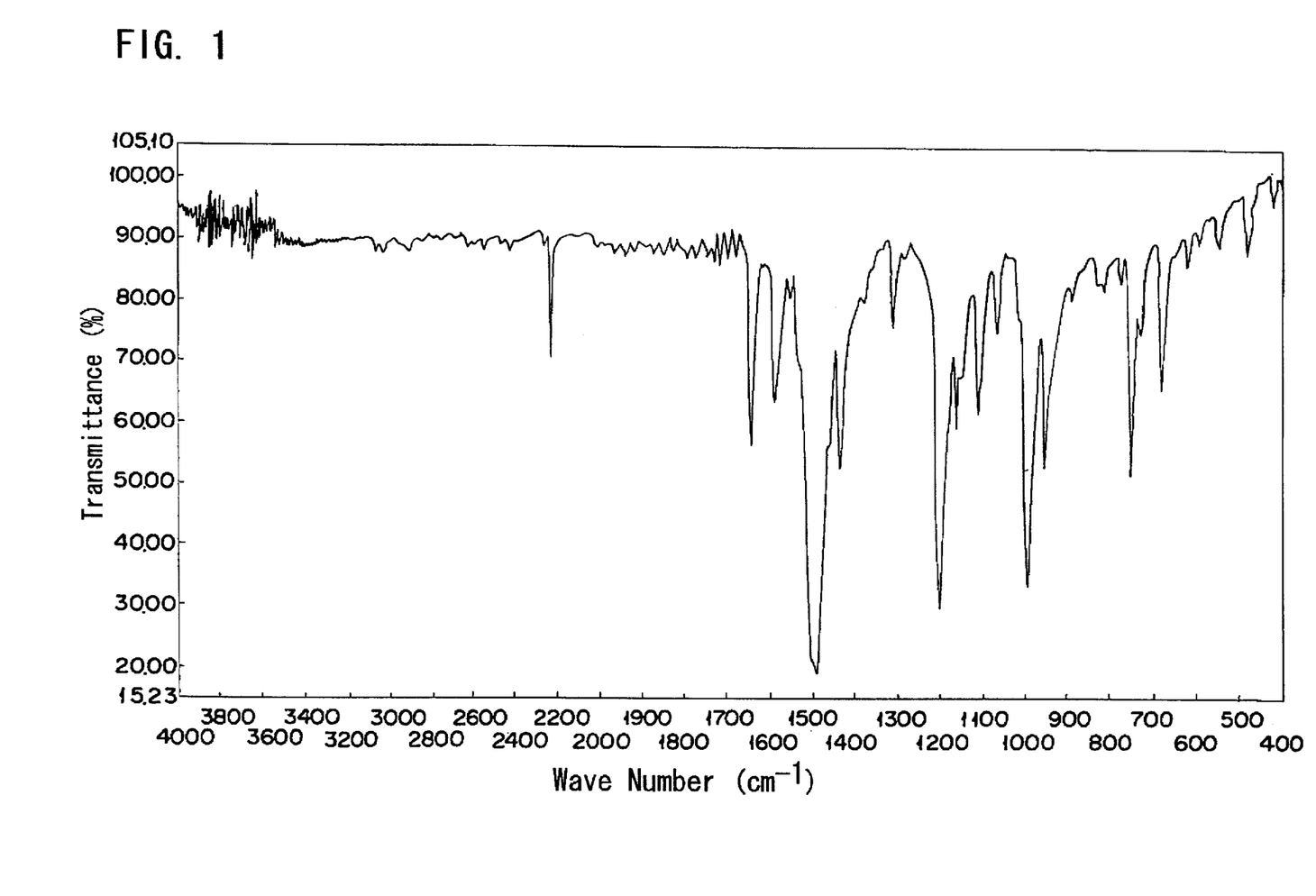
FIG. 1 is an IR spectrum of PtFBN to be obtained in Synthetic Example 1.
Figure 2:
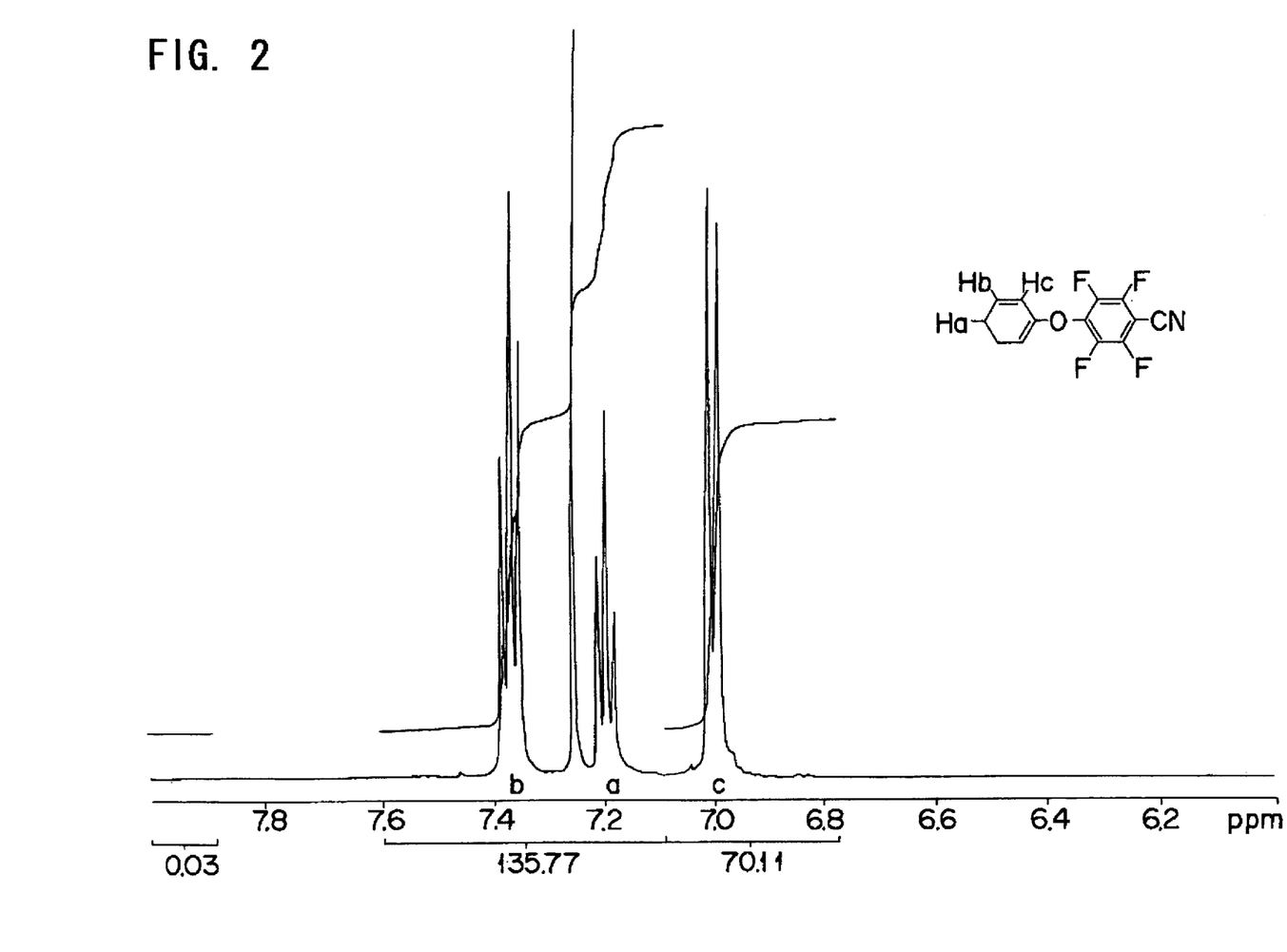
FIG. 2 is a $^1$H-NMR spectrum of PtFBN to be obtained in Synthetic Example 1.
Figure 3:
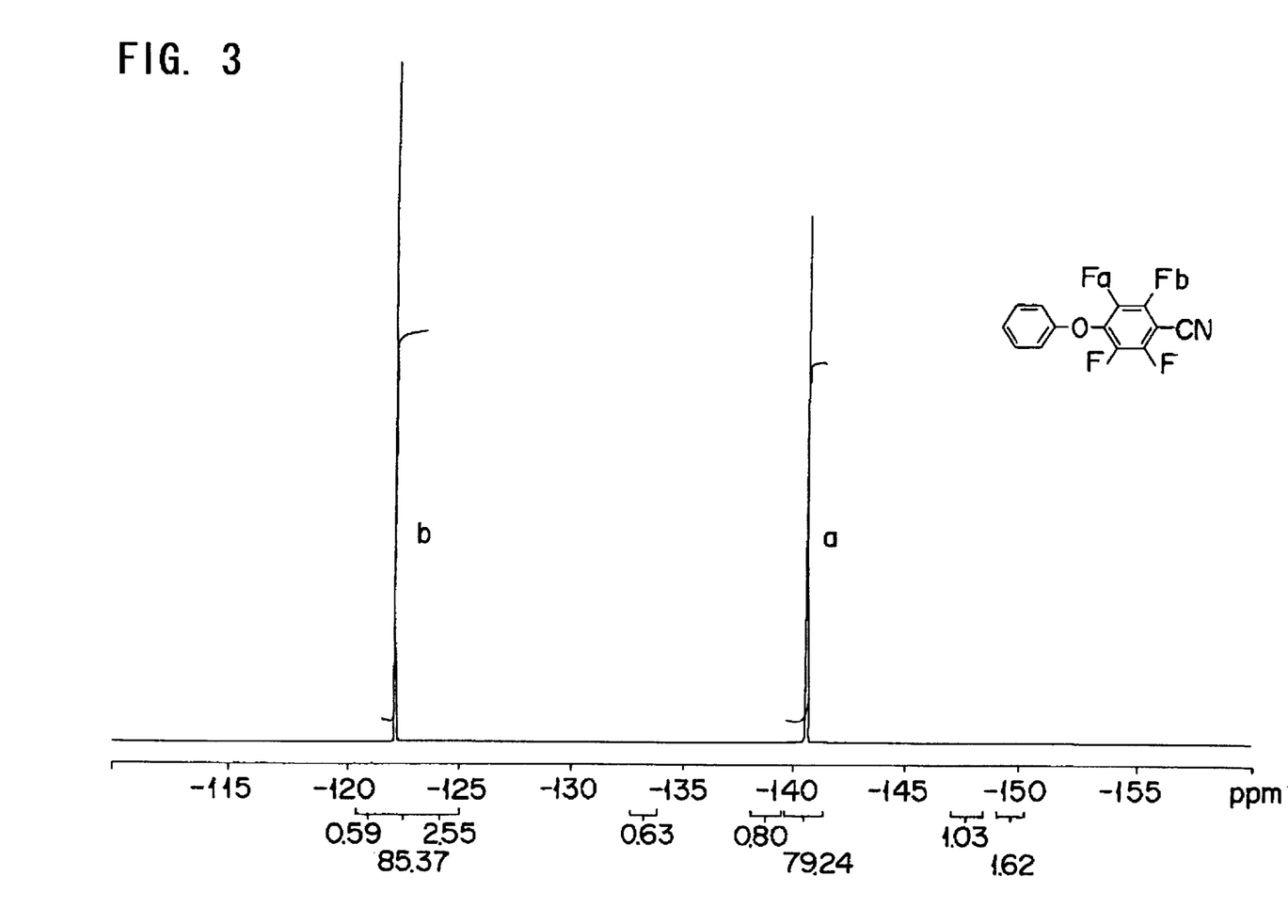
FIG. 3 is a $^{19}$F-NMR spectrum of PtFBN to be obtained in Synthetic Example 1.

Then, the resultant crude product was distilled under a reduced pressure at 102° C./0.4 mmHg, and there after recrystallized with ethanol to obtain a white crystal. The yield thereof was found to be 40%. The melting temperature of the obtained product was also found to be 68° C. The IR (KBr) spectrum, $^1$H-NMR ($CDCl_3$) spectrum and $^{19}$F-NMR ($CDCl_3$) spectrum of this product are shown in FIG. 1, FIG. 2 and FIG. 3, respectively. In the $^{19}$F-NMR spectrum, $^{19}$F chemical shifts are reported in ppm relative to 4,4'-difluorobenzophenone=–110.1 ppm.

EXAMPLE 1

Synthesis of 2F-PEN-6FBA

The following polymerization reaction was carried out as below.

More specifically, in a flask provided with a reflux tube and a Dean-Stark trap of 25 ml in volume, 0.377 g (1.12 (53.2 millimoles) of 2,2-bis(4-hydroxyphenyl)-1,1,1,3,3,3-hexafluoropropane (6FBA), 0.171 g (1.24 millimoles) of potassium carbonate, 2.5 ml of N-methyl-2-pyrrolidinone (NMP) and 2.5 ml of toluene were placed. The resultant mixture was subjected to the azeotropic dehydration at 130° C. for two hours under a nitrogen current, to synthesize a potassium salt of 6FBA. After the stoichiometric amount (about 0.04 ml) of water had been confirmed, toluene was removed by distillation, and the residual solution was cooled. At the time when temperature of the reaction solution reached 80° C., 0.300 g (1.12 millimoles) of PtFBN to be obtained by Synthetic Example 1 was added to the reaction solution. The resultant mixture was reacted for 8 hours with this temperature maintained.

After the reaction had been completed, the resultant solution was poured into an aqueous 1% acetic acid solution while vigorously stirred with a blender. The precipitated polymer was separated by filtration, washed with distilled water and methanol, and then dried under a reduced pressure. The polymer thus recovered was dissolved in dimethyl acetamide (DMAc) so as to give a concentration of 30

Figure 4:
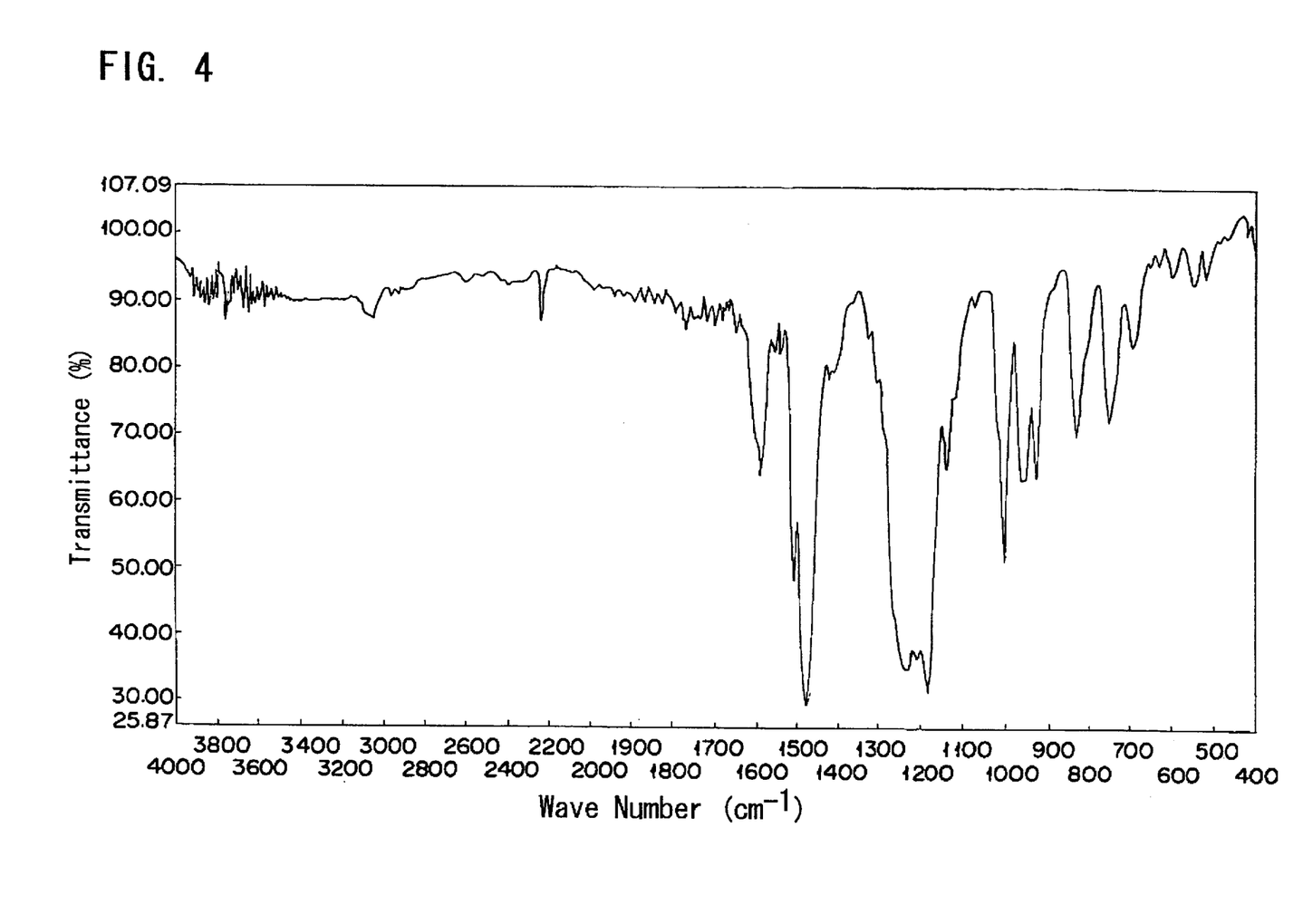
FIG. 4 is an IR spectrum of 2F-PEN-6FBA to be obtained in Example 1.
Figure 5:
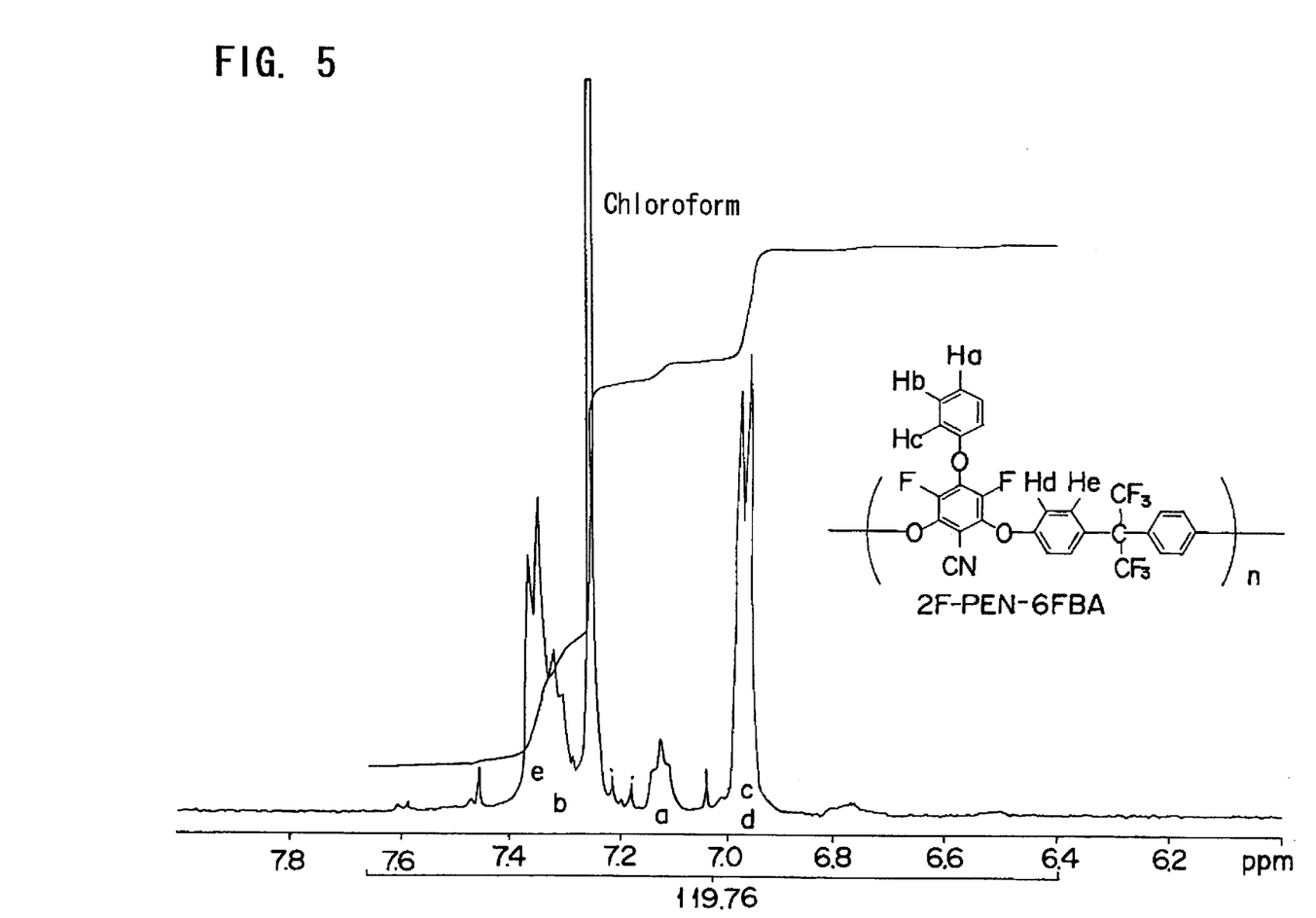
FIG. 5 is a $^1$H-NMR spectrum of 2F-PEN-6FBA to be obtained in Example 1.
Figure 6:
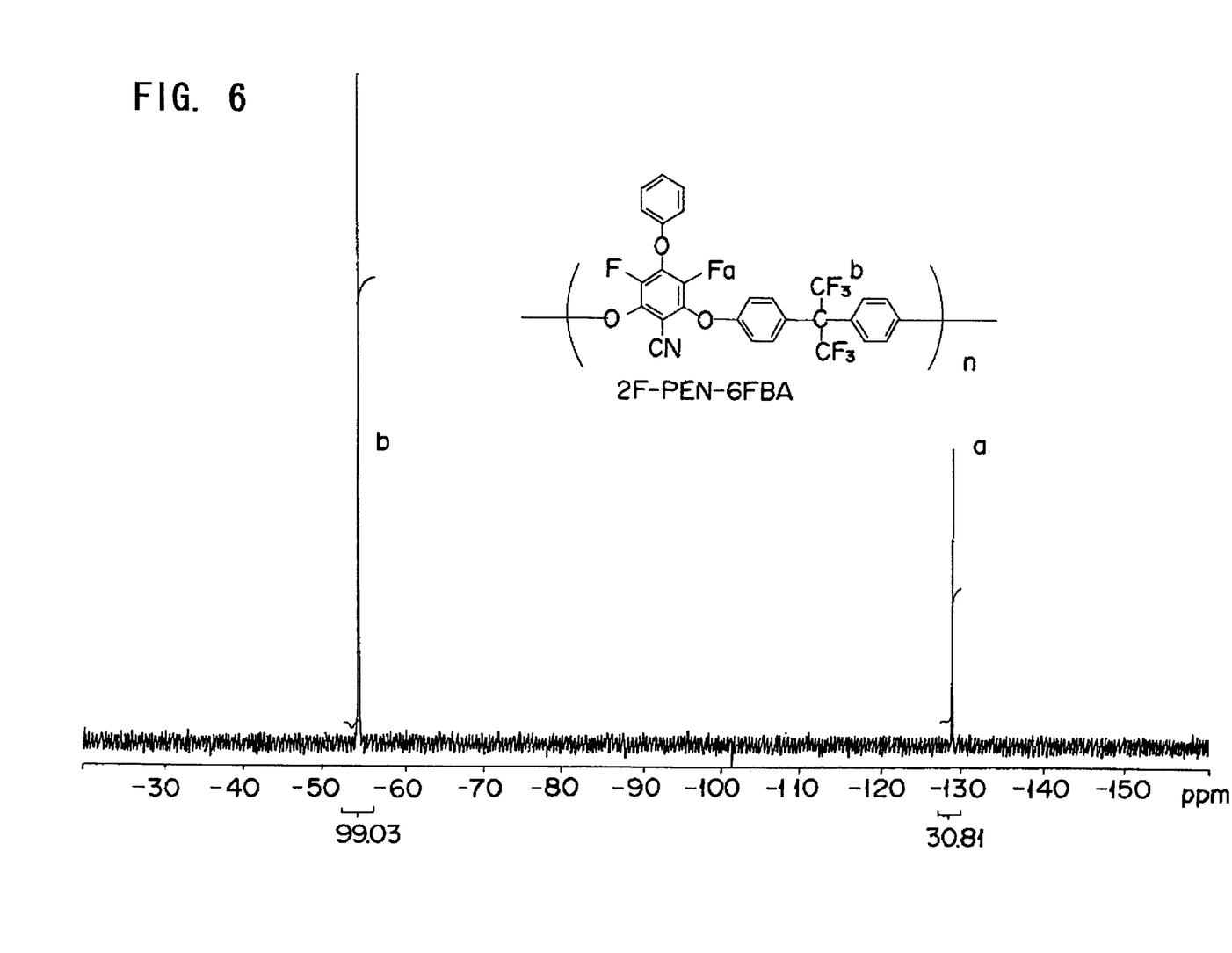
FIG. 6 is a $^{19}$F-NMR spectrum of 2F-PEN-6FBA to be obtained in Example 1.

(w/v)%. The resultant solution was slowly poured into methanol with stirred, and purified by a recrystallization method. After standing the polymer until the complete solidification was attained, the precipitated and solidified polymer was filtered and dried under a reduced pressure. The yield thereof was found to be 86.0%. The glass transition temperature of the obtained product was also found to be 163.0° C. The IR (film) spectrum, $^1$H-NMR (CDCl$_3$) spectrum and $^{19}$F-NMR (CDCl$_3$) spectrum of this product are shown in FIG. 4, FIG. 5 and FIG. 6, respectively. In the $^{19}$F-NMR spectrum, $^{19}$F chemical shifts are reported in ppm relative to 4,4'-difluorobenzophenone=−110.1 ppm.

EXAMPLE 2

A 2F-PEN-PP was obtained as a product by the same reaction as in Example 1 except that 0.358 g (1.12 millimoles) of PP was used in place of 0.377 g (1.12 (53.2 millimoles) of 6FBA. The yield of this product was found to be 94.9%. The glass transition temperature of the obtained product was also found to be 235.0° C.

EXAMPLE 3

A 2F-PEN-BA was obtained as a product by the same reaction as in Example 1 except that 0.256 g (1.12 millimoles) of BA was used in place of 0.377 g (1.12 (53.2 millimoles) of 6FBA. The yield of this product was found to be 86.8%. The glass transition temperature of the obtained product was also found to be 143.6° C.

EXAMPLE 4

A 2F-PEN-HF was obtained as a product by the same reaction as in Example 1 except that 0.394 g (1.12 millimoles) of HF was used in place of 0.377 g (1.12 (53.2 millimoles) of 6FBA. The yield of this product was found to be 93.5%. The glass transition temperature of the obtained product was also found to be 232.2° C.

EXAMPLE 5

A 2F-PEN-HQ was obtained as a product by the same reaction as in Example 1 except that 0.123 g (1.12 millimoles) of HQ was used in place of 0.377 g (1.12 (53.2 millimoles) of 6FBA. The yield of this product was found to be 85.5%. The glass transition temperature of the obtained product was also found to be 145.9° C.

EXAMPLE 6

A 2F-PEN-CHB was obtained as a product by the same reaction as in Example 1 except that 0.394 g (1.12 millimoles) of CHB was used in place of 0.377 g (1.12 (53.2 millimoles) of 6FBA. The yield of this product was found to be 87.4%. The glass transition temperature of the obtained product was also found to be 151.8° C.

EXAMPLE 7

A 2F-PEN-DPE was obtained as a product by the same reaction as in Example 1 except that 0.301 g (1.12 millimoles) of DPE was used in place of 0.377 g (1.12 (53.2 millimoles) of 6FBA. The yield of this product was found to be 87.1%. The glass transition temperature of the obtained product was also found to be 142.0° C.

EXAMPLE 8

A 2F-PEN-BP was obtained as a product by the same reaction as in Example 1 except that 0.209 g (1.12 millimoles) of BP was used in place of 0.377 g (1.12 (53.2 millimoles) of 6FBA. The yield of this product was found to be 90.7%. The glass transition temperature of the obtained product was also found to be 179.4° C.

The reduced viscosity, molecular weight and glass transition temperature of each the products to be obtained by Examples 1 to 8 are shown in Table 1, and the thermal stabilities thereof are shown in Table 2.

TABLE 1

| Example | Polymer | Reduced viscosity (dL/g) | Mn (×10$^4$) | Mw (×10$^4$) | Mw/Mn | Tg (° C.) |
|---|---|---|---|---|---|---|
| 1 | 2F-PEN-6FBA | 0.66 | 5.16 | 29.07 | 5.63 | 163.0 |
| 2 | 2F-PEN-PP | 0.44 | 2.82 | 11.22 | 3.98 | 235.0 |
| 3 | 2F-PEN-BA | 0.35 | 2.19 | 6.34 | 2.90 | 143.6 |
| 4 | 2F-PEN-HF | 0.32 | 1.92 | 7.96 | 4.13 | 232.2 |
| 5 | 2F-PEN-HQ | 0.34 | 2.00 | 4.03 | 2.02 | 145.9 |
| 6 | 2F-PEN-CHB | 0.22 | 1.77 | 3.86 | 2.17 | 151.8 |
| 7 | 2F-PEN-DPE | 1.27 | 2.98 | 20.33 | 6.81 | 142.0 |
| 8 | 2F-PEN-BP | 0.57 | 3.17 | 7.57 | 2.39 | 179.4 |

TABLE 2

| Example | Polymer | Tg (° C.) | 10 wt % loss (° C.) | Residual Amount at 600° C. (%) |
|---|---|---|---|---|
| 1 | 2F-PEN-6FBA | 163.0 | 561 | 75 |
| 2 | 2F-PEN-PP | 235.0 | 554 | 76 |
| 3 | 2F-PEN-BA | 143.6 | 546 | 68 |
| 4 | 2F-PEN-HF | 232.2 | 593 | 89 |
| 5 | 2F-PEN-HQ | 145.9 | 550 | 73 |
| 6 | 2F-PEN-CHB | 151.8 | 522 | 60 |
| 7 | 2F-PEN-DPE | 142.0 | 567 | 80 |
| 8 | 2F-PEN-BP | 179.4 | 582 | 86 |

EXAMPLE 9

The polymers to be obtained by Examples 1 to 8 were tested for the solubility. The results are shown in Table 3.

TABLE 3

| Example | Polymer | Solvent* DMAc | NMP | Chloroform | Toluene | Methanol |
|---|---|---|---|---|---|---|
| 1 | 2F-PEN-6FBA | ++ | ++ | ++ | ++ | − |
| 2 | 2F-PEN-PP | ++ | ++ | − | − | − |
| 3 | 2F-PEN-BA | ++ | ++ | ++ | ++ | − |
| 4 | 2F-PEN-HF | ++ | ++ | − | − | − |
| 5 | 2F-PEN-HQ | + | + | − | − | − |
| 6 | 2F-PEN-CHB | ++ | ++ | − | − | − |
| 7 | 2F-PEN-DPE | ++ | ++ | ++ | ++ | − |
| 8 | 2F-PEN-BP | ++ | ++ | − | − | − |

*) ++: Soluble at a room temperature, +: Partially soluble, ±: Swollen, −: Insoluble.

EXAMPLE 10

The polymers to be obtained by Examples 1, 3, 5 and 7 were for the film-formability. The results are shown in Table 4.

TABLE 4

| Example | Polymer | Film-formability* | Rigidity | Hue |
|---|---|---|---|---|
| 1 | 2F-PEN-6FBA | ++ | Toughness | Light Yellow |
| 3 | 2F-PEN-BA | ++ | Toughness | Light Yellow |
| 5 | 2F-PEN-HQ | + | Brittleness | Light Yellow |
| 7 | 2F-PEN-DPE | ++ | Toughness | Light Yellow |

*) ++; Excellent, +; Good, ±; Poor, −; Very poor.

The entire disclosure of Japanese Patent Application No. 2000-130877filed on Apr. 28, 2000 including specification, claims, drawings and summary are incorporated herein by reference in its entirety.

What is claimed is:

1. A polycyanoaryl ether represented by the formula (1):

(1)

wherein $R^1$ stands for a substituted or unsubstituted alkyl group of 1 to 12 carbon atoms, a substituted or unsubstituted alkoxy group of 1 to 12 carbon atoms, a substituted or unsubstituted alkylamino group of 1 to 12 carbon atoms, a substituted or unsubstituted alkylthio group of 1 to 12 carbon atoms, a substituted or unsubstituted aryl group of 6 to 20 carbon atoms, a substituted or unsubstituted aryloxy group of 6 to 20 carbon atoms, a substituted or unsubstituted arylamino group of 6 to 20 carbon atoms, or a substituted or unsubstituted arylthio group of 6 to 20 carbon atoms; $R^2$ stands for a divalent organic group; and n stands for a degree of polymerization.

2. A polycyanoaryl ether according to claim 1, wherein $R^1$ in the formula (1) stands for a substituted or unsubstituted aryloxy group of 6 to 20 carbon atoms.

3. A polycyanoaryl ether according to claim 2, wherein $R^1$ in the formula (1) stands for a substituted or unsubstituted phenoxy group.

4. A polycyanoaryl ether according to claim 1, wherein $R^2$ in the formula (1) stands for a group selected from the group consisting of:

5. A method for the production of the polycyanoaryl ether according to claim 1, which comprises polymerizing a tetrafluorobenzonitrile derivative represented by the formula (2):

(2)

wherein $R^1$ stands for a substituted or unsubstituted alkyl group of 1 to 12 carbon atoms, a substituted or unsubstituted alkoxy group of 1 to 12 carbon atoms, a substituted or unsubstituted alkylamino group of 1 to 12 carbon atoms, a substituted or unsubstituted alkylthio group of 1 to 12 carbon atoms, a substituted or unsubstituted aryl group of 6 to 20 carbon atoms, a substituted or unsubstituted aryloxy group of 6 to 20 carbon atoms, a substituted or unsubstituted arylamino group of 6 to 20 carbon atoms, or a substituted or unsubstituted arylthio group of 6 to 20 carbon atoms, with a dihydroxy compound represented by the formula (3):

$$HO-R^2-OH \qquad (3)$$

wherein $R^2$ stands for a divalent organic group, in the presence of a basic catalyst.

6. A method according to claim 5, wherein the polymerization of said tetrafluorobenzonitrile derivative with said dihydroxy compound is carried out at a temperature of not more than 200° C.

7. A method according to claim 5, wherein said basic catalyst is at least one member selected from the group consisting of potassium carbonate, calcium carbonate, potassium hydroxide, calcium hydroxide, and potassium fluoride.

8. A method according to claim 5, wherein said dihydroxy compound is a compound selected from the group consisting of:

-continued and

* * * * *